United States Patent [19]
Lore et al.

[11] Patent Number: 6,163,774
[45] Date of Patent: Dec. 19, 2000

[54] METHOD AND APPARATUS FOR SIMPLIFIED AND FLEXIBLE SELECTION OF AGGREGATE AND CROSS PRODUCT LEVELS FOR A DATA WAREHOUSE

[75] Inventors: Michael Dean Lore, Katy, Tex.; Eva Man-Yan Tse, Sunnyvale, Calif.

[73] Assignee: Platinum Technology IP, Inc., Oakbrook Terrace, Ill.

[21] Appl. No.: 09/317,247

[22] Filed: May 24, 1999

[51] Int. Cl.[7] ................................... G06F 17/30
[52] U.S. Cl. ................... 707/2; 707/3; 705/10; 705/36
[58] Field of Search ............... 707/2, 3, 4, 5–6, 707/100–102; 706/12, 47, 46; 345/355, 357, 440, 326; 705/10, 36

[56] References Cited

U.S. PATENT DOCUMENTS

| | | | |
|---|---|---|---|
| 5,692,107 | 11/1997 | Simoudis et al. | 706/12 |
| 5,822,751 | 10/1998 | Gray et al. | 707/3 |
| 5,918,232 | 6/1999 | Pouschine et al. | 707/103 |
| 5,940,818 | 8/1999 | Malloy et al. | 707/2 |
| 5,978,796 | 11/1999 | Malloy et al. | 707/3 |
| 5,999,192 | 12/1999 | Selfridge et al. | 345/440 |
| 6,009,432 | 12/1999 | Tarin | 707/10 |
| 6,032,146 | 2/2000 | Chadha et al. | 707/6 |

FOREIGN PATENT DOCUMENTS

| | | | |
|---|---|---|---|
| 411003354A | 1/1999 | Japan | 17/30 |

OTHER PUBLICATIONS

"Implementing Data Cubes Efficiently," Harinarayan et al., Proceedings of the 1996 ACM SIGMOD International Conference, Montreal, Canada, pp. 205–216, Jun. 1996.

"Database System Support for Multidimensional Data Analysis in Environmental Epidemiology," Kamp et al., Proceedings of the 1997 IDEAS, pp. 180–188, Aug. 1997.

"Leveling with Plato," Erik Thomsen, Intelligent Enterprize, vol. 2, No. 26, Jun. 1999, pp. 1–3.

Building, Using, and Managing the Data Warehouse, Ramon Barquin and Herb Edelstein, Editors.; Prentice Hall PTR, 1997.

Chapter 9: Database Design for Data Warehouses: The Basic Requirements describes general issues in building a data warehouse, 1997.

Pp. 30–32 on Browsing: Describes the use of levels for browsing multidimensional data, 1997.

*Primary Examiner*—Hosain T. Alam
*Attorney, Agent, or Firm*—Piper Marbury Rudnick & Wolfe

[57] ABSTRACT

A method of defining aggregate levels to be used in aggregation in a data store having one or more dimensions. Levels are defined corresponding to attributes in the dimension, so that data can be aggregated into aggregates corresponding to values of those attributes. The invention provides for the definition of sub-levels which act as levels but define which detail entries in the associated dimension will contribute to the sub-level. The invention also provides for the definition of level groups. A level group can replace a level in a level cross-product and such a cross product is then expanded before aggregation into a set of cross products, each containing one of the level group entries.

6 Claims, 3 Drawing Sheets

| KEY | UPC | NAME | PRICE | CATEGORY | BRAND | MANUFACTURER |
|---|---|---|---|---|---|---|
| 1 | 027354123322 | SMALL CHICKEN SOUP | $0.85 | FOOD | W | A |
| 2 | 027354169218 | LARGE CHICKEN SOUP | $1.27 | FOOD | W | A |
| 3 | 027351747019 | SMALL TURKEY | $9.99 | FOOD | X | A |
| 4 | 027351836706 | LARGE TURKEY | $18.99 | FOOD | X | A |
| 5 | 032857382091 | CAVIAR | $16.99 | FOOD | Y | B |
| 6 | 021847592725 | HAMMER | $13.99 | TOOLS | Z | C |
| 7 | 021847178929 | SCREWDRIVER SET | $16.99 | TOOLS | Z | C |
| 8 | | | | | W | A |
| 9 | | | | | X | A |
| 10 | | | | | Y | B |
| 11 | | | | | Z | C |
| 12 | | | | | X | A |
| 13 | | | | | Y | B |

| LEVEL CODE | AGGREGATE KEY | DETAIL KEY |
|---|---|---|
| 1 (MAIN LEVEL) | 8 | 1 |
| 1 (MAIN LEVEL) | 8 | 2 |
| 1 (MAIN LEVEL) | 9 | 3 |
| 1 (MAIN LEVEL) | 9 | 4 |
| 1 (MAIN LEVEL) | 10 | 5 |
| 1 (MAIN LEVEL) | 11 | 6 |
| 1 (MAIN LEVEL) | 11 | 7 |
| 2 (SUB-LEVEL) | 12 | 4 |
| 2 (SUB-LEVEL) | 13 | 5 |

| LEVEL CODE | AGGREGATE KEY | DETAIL KEY |
|---|---|---|
| 1 (MAIN LEVEL) | 8 | 1 |
| 1 (MAIN LEVEL) | 8 | 2 |
| 1 (MAIN LEVEL) | 9 | 3 |
| 1 (MAIN LEVEL) | 9 | 4 |
| 1 (MAIN LEVEL) | 10 | 5 |
| 1 (MAIN LEVEL) | 11 | 6 |
| 1 (MAIN LEVEL) | 11 | 7 |
| 2 (SUB-LEVEL) | 12 | 4 |
| 2 (SUB-LEVEL) | 13 | 5 |

*FIG. 2B*

| LEVEL CODE | AGGREGATE KEY | DETAIL KEY |
|---|---|---|
| 1 (MAIN LEVEL) | 8 | 1 |
| 1 (MAIN LEVEL) | 8 | 2 |
| 1 (MAIN LEVEL) | 8 | 3 |
| 1 (MAIN LEVEL) | 8 | 4 |
| 1 (MAIN LEVEL) | 8 | 5 |
| 1 (MAIN LEVEL) | 8 | 6 |
| 1 (MAIN LEVEL) | 8 | 7 |
| 2 (SUB-LEVEL1) | 9 | 1 |
| 2 (SUB-LEVEL1) | 9 | 5 |
| 2 (SUB-LEVEL1) | 9 | 7 |
| 3 (SUB-LEVEL2) | 10 | 4 |
| 4 (SUB-LEVEL3) | 11 | 2 |
| 4 (SUB-LEVEL3) | 11 | 3 |
| 5 (PREFIX LEVEL) | 12 | 5 |
| 5 (PREFIX LEVEL) | 12 | 7 |
| 5 (PREFIX LEVEL) | 13 | 2 |
| 5 (PREFIX LEVEL) | 13 | 3 |
| 5 (PREFIX LEVEL) | 14 | 4 |
| 5 (PREFIX LEVEL) | 15 | 6 |

| KEY | SSN | NAME | SEX | ADDRESS | PHONE NUMBER | PHONE NUMBER PREFIX |
|---|---|---|---|---|---|---|
| 1 | 323-32-7354 | FRED JONES | M | 13 NORTH AV... | 281-514-3241 | 281 |
| 2 | 635-43-7825 | SARAH WILLIAMS | F | 27 W. STATE ST... | 713-425-9924 | 713 |
| 3 | 145-62-8711 | CHRIS BANKS | M | 1400 S. PARK AV... | 713-542-1948 | 713 |
| 4 | 962-53-7317 | STEVE DAVIS | M | 66 W. LINCOLN... | 213-562-9354 | 213 |
| 5 | 579-38-7889 | JANE CLARK | F | 28 NORTH AV... | 281-738-9531 | 281 |
| 6 | 325-43-7315 | BRIAN WATTS | M | 50 E. WASHINGTON... | 123-458-4368 | 123 |
| 7 | 560-39-1943 | TRICIA ELLIOTT | F | 94 NORTH AV... | 281-424-4903 | 281 |
| 8 | | | | | | |
| 9 | | | | | | |
| 10 | | | | | | |
| 11 | | | | | | |
| 12 | | | | | | 281 |
| 13 | | | | | | 713 |
| 14 | | | | | | 213 |
| 15 | | | | | | 123 |

METHOD AND APPARATUS FOR SIMPLIFIED AND FLEXIBLE SELECTION OF AGGREGATE AND CROSS PRODUCT LEVELS FOR A DATA WAREHOUSE

BACKGROUND OF THE INVENTION

This patent application relates to a method of selecting aggregates to generate in a data warehouse.

Figure 1:
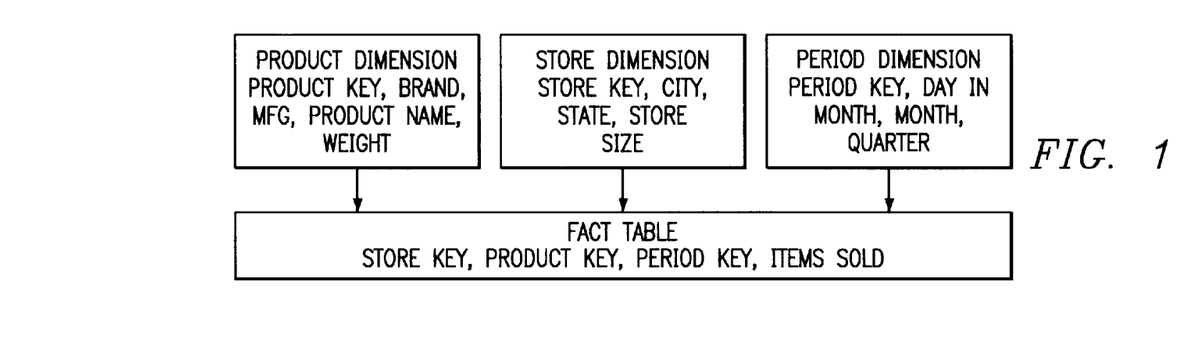
FIG. 1 shows an example of a star schema of a simple supermarket business given which could be processed by the invention.

A data warehouse generally contains large quantities of data relating to a business structure from which information is retrieved and analyzed. The Data Warehouse Toolkit by Ralph Kimball. John Wiley & Sons, Inc. ISBN 0-471-15337-0 provides an excellent background on data warehouses. One of the first steps in building a successful data warehouse is to correctly identify the different dimensions and the fact set within a business structure. This is often known as dimensional modeling. Each dimension represents a collection of unique entities that participate in the fact set independent of entities from another dimension. The fact set usually contains transactional data where each transaction (or record) is identified by a combination of entities, one from each dimension. FIG. 1 describes a star schema for a supermarket business where the star schema is the outcome of the dimension modeling process.

Each dimension is a table where each record contains a key (or a composite key) to uniquely identify each entity and a list of attributes to qualify or describe the corresponding entity (or key). Each fact record in the fact table would contain a foreign key to join to each dimension and a list of measures which represents the transactional data. The dimension table is usually not further normalized because the size of a dimension is usually much smaller than that of the fact table. Thus, the space saved by normalizing would not be that significant. Also, it is not time-effective for an OLAP query tool to join the normalized dimension tables at query run-time.

Theoretically, an OLAP tool could directly query against a data warehouse containing transactional data in the above star schema layout. However, in order to allow fast response time on high level queries, for instance, a query to get the monthly sales volume of a particular brand product for each state, pre-aggregation of data in a data warehouse is definitely required.

Pre-aggregation of data is important because it facilitates fast query response times from OLAP tools on commonly asked queries (questions). Thus, it is even more important to be able to define the right set of aggregates to generate in the data warehouse. Otherwise, OLAP tools may not be able to benefit from pre-computed aggregates.

Levels of data are specified in each dimension for aggregation purposes. Each level defines a grouping of dimension entries based on a condition. For instance, in the store dimension, a level could be specified for different states so that the level would contain one aggregate dimension record for each state where each aggregate record represents at least one store. In other words, an aggregate dimension record for a particular state would represent the aggregation of all stores that are in that state. Similarly, we could specify another city level in the store dimension to allow the creation of aggregate dimension records where each entry represents the aggregation of all stores in a particular city. Levels are also referred to as aggregation levels.

Thus, each level determines the group of aggregates generated at that particular level. The rule or condition associated with each level is used for the recognition of the containment relationship between detail dimension records and aggregated dimension records. The condition also determines the flexibility of grouping detail level dimension records into different aggregates.

Each aggregate dimension record contains a surrogate (or synthetic) key because a dimension record for it is not originally present in the input dimension table. The key is used to join the aggregate dimension records with the aggregates generated in the output fact table. In most cases, surrogate keys are also generated for input dimension records so that both aggregate and input dimension records will have the same layout. In this case, all fact aggregate records may also have one layout because they may join to each dimension aggregate or input level record with the same type of keys.

Not all attributes are valid or meaningful for an aggregate dimension record. In those cases, those attribute values are suppressed. For instance, in a store dimension, an aggregate dimension record at the state level will have its street address and city attributes suppressed because these attributes described individual stores. Suppressed attributes may be filled with a null value or a default value specified by users.

The aggregates required in the output fact data are specified by a combination of levels, one from each dimension, to be aggregated on. The combination of levels used to specify aggregation is also referred as a cross product of levels. To do a month by brand by state query in the above star schema example, the corresponding level would need to be defined in each of the dimensions and the aggregation of transactional data would need to be requested based on the cross product of the three specified levels. Users may specify a list of cross products for which they desire aggregations. The cross product of input (or detail) levels represents the input or detail fact data.

A "dimension" level will often be defined in a dimension with a single member containing all the dimension records. Using such a level in a cross-product effectively removes that dimension from the cross product. For example, if the dimension level is specified in the product dimension of the above cross product, a month by state query would be generated.

The technique described in this document relates to defining levels within a dimension.

Many OLAP tools today allow users to specify simple aggregation levels. These levels are usually based on distinct values in one or more columns of a table. This technique serves most of the needs of repetitive and simple OLAP queries. However, more advanced queries over combinations of columns or using complex selection criteria could benefit from more sophisticated pre-generated aggregates. In some cases, these more sophisticated queries are the norm.

A previous product created by the present assignee provides a consulting service which performs recognition of the containment relationship between detail dimension records and aggregate dimension records, and performs aggregation of fact data. The level rule used for recognizing aggregate dimension records is strictly based on distinct attribute values. Each level rule can have zero or more rule items. if no rule item is specified in a level rule, that means all dimension records will be aggregated into one aggregate record unconditionally. Each rule item refers to one distinct dimension attribute and the rule item can be either conditional or unconditional.

An unconditional rule item only consists of an attribute from the corresponding dimension. For instance, the Store dimension may have a level with an unconditional rule item for the State attribute. That means there will be one aggregate dimension record generated for each distinct value of State attribute in the input dimension.

A conditional rule item consists of an attribute, an equal or not equal operator, and a value. For instance, if the conditional rule item is "state equal TX" for the store dimension, then one aggregate dimension record will be generated if there are dimension records with state equals TX. If the conditional rule item is "state not equal TX", then one aggregate dimension record will be generated for each distinct value of the state attribute except for TX.

Level rules with multiple rule items would generate one aggregate dimension record for each distinct combination of attribute values from the set of rule items. Specifying multiple rule items allows for recognition of hierarchical levels without knowing the actual hierarchical order of the attributes or levels. For instance, a level rule can have two unconditional rule items: one for the state attribute and another for the city attribute. If there are two cities with the same name but from a different state, they will generate two different aggregation records appropriately. On the other hand, if the level rule has only one unconditional rule item for the city attribute, fact data of the two cities will be mistakenly aggregated into one record.

Another product providing aggregation is Microsoft's SQL Server 7.0 Beta OLAP server, code named Plato. Each level is associated with one dimensional attribute. However, all levels are specified in hierarchical order, so one aggregate record is generated for each distinct attribute value combination from the current and all the higher levels. Thus, it is similar to the unconditional level rule of the present assignee's previous product described above.

OLAP and aggregation products need a concise and flexible method for identifying aggregation levels. A common practice is to identify levels from the distinct values present in one or more columns of the dimension table. Each unique combination of the level columns represents an aggregation at that level. For instance, the level columns City and State may have a unique combination of Houston and Texas, which represents one aggregation at the City aggregation level.

The common practice is not particularly flexible for a number of reasons:

The capability is required to specify levels that can limit the aggregates generated, so that all combinations are not produced. It is important to control the growth of the data warehouse, and generating little-used aggregates or aggregates that do not involve much data anyway is expensive and wastes space. As an example, if only one store is in Austin, Tex., the user should be able to prevent aggregate records for Austin from being added to the dimension. In this manner, the user can tune which aggregates are really needed to speed up OLAP analysis. Previous products provided selection capability to an extent, but their use was very cumbersome.

The capability is required to specify levels that are not easily derived from the dimension attributes. For example, given State, City, and Population attributes, we might want aggregates for a state's small towns. Although it is easy to create a level involving City, State, and Population<50000 (easy assuming you have expression-based level identification), this produces individual aggregate dimension records like Navasota, Tex., 23450 and Paris, Tex., 34982. There is no immediate way to get a single aggregate for All Cities in State whose Population<50000. This means that the OLAP tool would resort to querying against more rows.

The capability is also required to group levels so that the cross product of levels (described earlier) is easier to specify succinctly. If you have only ten levels per dimension for three dimensions, all combinations result in a cross product of levels that is 1,000 entries long.

The capability is further required to specify levels for which the attributes are inadequate. As an example, if attributes were available for Male Population, Female Population, Male Average Age, and Female Average Age but a condition was wanted around "Average Age>50, " an "average age" attribute is not directly available to create this level, even though there is in theory sufficient information to establish the level. Some products solve this problem by providing "derived attributes" which are not maintained in the dimension tables permanently, but are generated for aggregation purposes. This can work well in certain situations, but can cause problems in systems that track attributes over time. For example, synthetic keys representing level members in the dimension tables are often stored permanently in the dimension tables. Synthetic keys associated with certain attributes never change, and aggregates generated at different times will have the same key values. The fact that the aggregates maintain the same keys can be very useful. However, if derived attributes are used, which are inherently not persistent between aggregations, aggregates generated at different times will inevitably have different keys for the same attribute value. For this reason, many architectures avoid the use of derived attributes, thereby maintaining unchanging synthetic keys, but the advantages afforded by such derived attributes are often still desired.

SUMMARY OF THE INVNTION

In one aspect of the invention, expression-based level identification is provided, allowing simpler and more powerful selection of levels. Rather than defining levels by simply specifying attributes in a dimension which are involved, an expression for each level rule can be provided for each attribute limiting the values of that attribute which will contribute to the level.

In another aspect of the invention, sublevels are provided which are grouped on the same attribute values as their parent level, but narrow the criteria for a detail entry taking part in a level on the basis of a rule which can involve the combination of attributes in any or all of the columns. This is different from the known concept of hierarchical levels by which levels can be defined based on level rules using two or more columns as the hierarchical level concept does not allow the values in different columns to be combined. The sub-level concept therefore allows additional levels which cannot be achieved with a level rule alone. For example, by using a sublevel selection criteria, the average age can be computed from other attributes such as female average age, male average age, female population and male population using the other values and use that as the basis for generation of aggregation records. A simpler example would be computing aggregates for southern states, when a "Southern" attribute is not available. A sublevel can be used to detect if the state is in the list of southern states.

Sublevels can act like a where condition on a parent level to support this capability. Using sublevels, a State level could be defined and a sublevel added with the condition Population<50000. This would produce aggregate dimension records like Texas, <null>, <null> for the "All Small Towns in State" sublevel. OLAP users can query against this level and compare results.

In a further aspect of the invention, level groups are provided which considerably simplify specifying which of the levels in a cross product of levels needs to be generated. Level groups allow the specification of the whole group in a single entry in the cross product. This makes the cross product easier to maintain.

BRIEF DESCRIPTION OF THE DRAWINGS

A specific embodiment of the invention is hereinafter described with reference to the drawings in which.

DETAILED DESCRIPTION OF THE INVENTION

Traditional levels are identified by a level rule that is a list of the columns whose values specify the aggregate records that are in the level. Given the Store dimension shown in FIG. 1, city and state levels are specified as follows:

City level rule=City, State

State level rule=State

Each column specified is a rule item. (Note: Products using this traditional technique use different terminology, but effectively the method is the same.) The city level rule indicates that the city level contains an aggregate dimension record for each unique combination of city and state. The state level rule indicates that the state level contains an aggregate dimension record for each unique state.

Rule items represent one and only one attribute column. Each rule item in a level rule must reference a different column from the rest. By using multiple rule items, hierarchical levels can be constructed. To make a single level for the "summary of everything," a level rule would have zero rule items.

Products that automatically generate the aggregate dimension records do so by extracting the unique combinations specified by the level rule from the detail dimension data. Most of these products have a way of omitting incomplete or empty data. For instance, if the state field is blank, usually a "blank" state aggregate is not wanted.

The invention enhances the concept of a traditional level rule by making each rule item a full-fledged expression. Each expression evaluates to TRUE if the attribute matches the condition and FALSE otherwise. Each rule item must reference one and only one column, and each rule item must reference a different column.

It is important to note that the rule item expressions do not alter the attributes. Instead, they limit which combinations of data in the dimension have aggregate records. For instance, a rule item could evaluate to TRUE when the first letter of the state is "T." In that case, aggregate records are created for "Texas" but not for "Michigan." If most of the data involves "Texas," that could prevent data from being unnecessarily aggregated.

A particular implementation of a rule item expression uses a reverse-polish notation simple expression language. The language includes mathematical operations, string operations, date operations, column referencing, register variables, and other features. This language is appropriate because it is effective, straight-forward to implement, and easily parsed by a user interface; most typical cases can be entered without exposing any expression language to the user. However, the particular expression language syntax is not particularly important to the implementation. Other suitable languages could be JavaScript, BASIC, Perl, Java, or others. The main requirement is that the language must have a method of accessing column variables (or a way to add that to the language).

Although a reverse-polish notation language is used internally, the examples given will use standard, mathematical-style infix expressions for the sake of clarity.

In this implementation, there are four common categories of level rule items, although infinite varieties of tests could be produced using expressions:

1) Equal, not equal, greater than, less than, greater than or equal, less than or equal.

Each of these comparison operators requires two operands: one attribute column expression and one value expression. The column expression must reference an attribute column. The value expression must evaluate to a constant value of same data type as the attribute column expression. The comparison operator basically determines if the condition is true.

2) Empty, not empty.

These operators require a reference to an attribute column and an optional empty value as their operand. Users could specify a value where the attribute column would be considered empty. For instance, the "N/A" value would indicate the weight attribute column as empty in a product dimension. If no empty value is specified for the referenced attribute column, the null value is considered the empty value for the attribute. These two operations test if the attribute of a detail record satisfies the empty or not empty condition.

3) Exists, not exists.

These operators are basically the same as "empty" and "not empty", except that they also utilize a program setting called "aggregate empty values." That program setting states that aggregate records should be created for values that would normally be considered empty. The "exists" operator is exactly equivalent to a traditional level rule item.

4) Include list, exclude list.

These operators require two operands: an attribute column expression and a list of value expressions. Given a detail record, they determine if the result value of the attribute column expression is or is not in the list of values, respectively. For "include list", all detail records that have an attribute evaluated to one of the values in the list satisfy the condition. For "exclude list", all detail records that have an attribute that does not evaluate to any of the values in the list satisfy the condition.

The potential types of rule items are certainly not limited to the above list, but the list defines the more common needs. Rule items can have combined tests as well. Rule items can be combined with logical operators like AND, OR, and NOT. Use of an expression language makes the rule items extremely flexible, as shown in some examples:

RULE ITEM=AgeGroup>30 and AgeGroup<=90

RULE ITEM=not (AgeGroup>30 and AgeGroup<=90)

RULE ITEM=Brand="ABrandName" or Brand="AnotherBrandName" (same result could be achieved by using the include list)

RULE ITEM=word_cap(Brand) in ("ABrandName", "AnotherBrandName")

When generating the list of aggregate records, detail dimension records are scanned to see if they participate in a level. Participating in a level means that the attributes of the detail record match the requirements of the level rule; the implication is that the given detail record identifies fact data that must be "summed up" to get the aggregates identified by the aggregate dimension record for that level.

A detail dimension record is considered eligible to participate in a level if it could meet the conditions of all rule items in the level rule. One aggregate dimension record will be generated for each distinct combination of attribute values where the attributes are used in the level rule. Note that aggregate records are generated based on distinct original attribute values, not on the attribute expression in a rule item. For instance, if the rule item is "Age div 10 =2", the result of the attribute expression "Age div 10" is always 2 for age attribute values ranging from 20 to 29. There are 10 different distinct attribute values. If this rule item is the only item in the level rule, ten different aggregate dimension records will be generated (one of each of the values from 20–29).

Expression-based level identification provides an excellent and flexible means of limiting which aggregates are produced in a simple manner.

A sublevel represents a means for placing additional criteria on a level. Sublevels allow additional operations that cannot be achieved with a level rule alone. Each aggregation level can have any number of sublevels. Sublevels act like a where condition by limiting which detail records actually participate in the sublevel.

Each sublevel can generate zero or more dimension aggregate records, up to the number of records generated for the parent level (sublevels are always defined in terms of a parent level). For each unique dimension aggregate record from the parent level, the sublevel will produce zero or one dimension aggregate record, depending on whether the sublevel condition is met.

Each sublevel rule consists of one boolean expression (i.e., the expression must evaluate to a TRUE or FALSE value). The boolean expression must reference one or more attribute columns. In the implementation of the present embodiment, the expression may utilize any of the supported operations of the language. The sublevel rule expression further filters the detail records participating in each aggregate record generated by the aggregation level rule.

In addition, sublevels also provide an option for users to generate aggregates that would otherwise require an additional attribute column in the dimension. The following examples demonstrate the flexibility and functionality of sublevels that cannot be replaced by aggregation level rules alone.

EXAMPLE 1

Figure 2A:
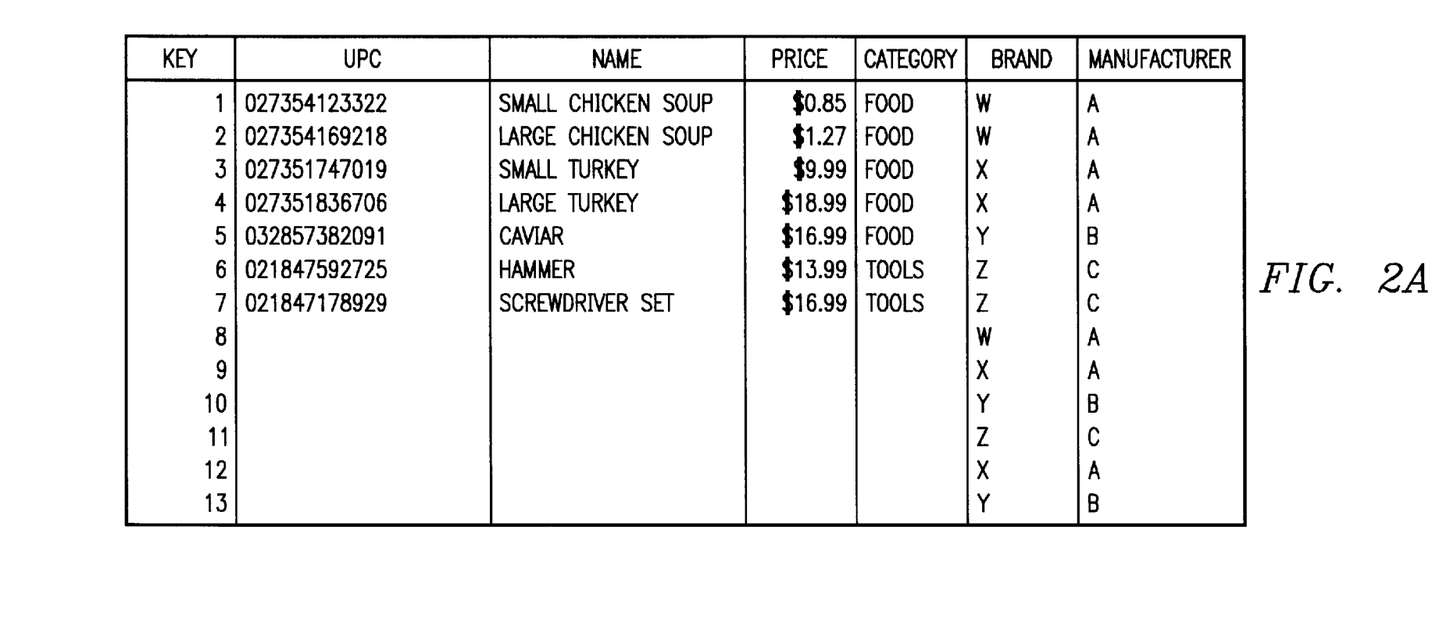
FIGS. 2A & 2B show a dimension table and a detail key to level member mapping table for a first example of a first embodiment of the invention.
Figure 2B:
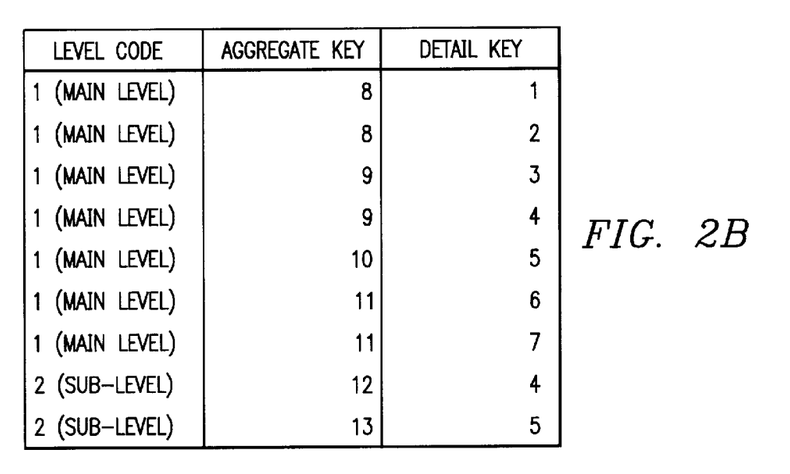

This example is represented in FIGS. 2A and 2B. FIG. 2A shows a product dimension table and FIG. 2B shows the level definitions within that dimension. The product dimension has the following attributes: UPC (Univeral Product Code), product name, price, category, brand, and manufacturer.

Level Rule: brand exists, manufacturer exists.
Sublevel Rule: price>10.00 and category="food"

With the above level rule, one aggregate dimension record is generated for each distinct combination of brand and manufacturer attributes (records 8–11). The sublevel rule is applied to the containing level rule to generate additional aggregate records (records 12–13). An aggregate record will be generated for a distinct combination of brand and manufacturer attribute values if and only if there exists at least one detail record that participates in the aggregate record and has a food category and a price greater than 10 dollars. Thus, the sublevel may generate fewer aggregate records than the enclosing aggregation level. In this case, there are only two sublevel records compared to four level records. Each aggregate record from the sublevel represents an aggregation of all food items greater than 10 dollars from a particular brand and manufacturer. (Note: In order to make the sublevel's aggregate records the only output of aggregation, the parent aggregation level should not be selected in the level cross product.)

Notice the above sublevel condition cannot be represented by the level rule alone because an aggregate record will be generated for each distinct combination of attributes used in the level rule. Thus, if the condition were to be put in the level rule, there would be one aggregate record for all food items which have the same brand and manufacturer with the same price. The grouping technique used in the level rule is not sufficient to specify a where condition like the sublevel rule.

Moreover, if the sublevel rule is not applied (i.e., the where condition) during aggregate generation, the aggregates generated by the sublevel rule cannot be derived from the set of aggregates generated by the level rule alone. The aggregates generated by the level rule will not contain any price or category information. Those attributes are suppressed because they are being aggregated over into the higher brand and manufacturer levels. Thus, the OLAP tool will not be able to find out which detail record in the aggregate has a price greater than 10 or is in the food category unless it also analyzes the detail records. It would then defeat the whole purpose of generating aggregates.

Another solution would involve having a level rule like: brand exists, manufacturer exists, price exists, category= "food". In this case, an aggregate record will be generated for each distinct combination of brand, manufacturer, and price with a category of "food". The OLAP tool can then apply the where condition of "price>10.00" onto the generated aggregates and further aggrgate the records with price>10.00. However, this would not take advantage of pre-aggregation because it is very likely that each product has a different price. In this case, the number of aggregates generated will be almost the same as the number of detail records.

Sublevels allow the application of a WHERE condition in the pre-aggregation phase which would benefit the OLAP query tool immensely, especially if the WHERE condition is a common filtering condition for the group of users. For instance, aggregates could be generated for employees within different age groups, aggregates for all products in a particular price range, etc.

EXAMPLE 2

Figure 3A:
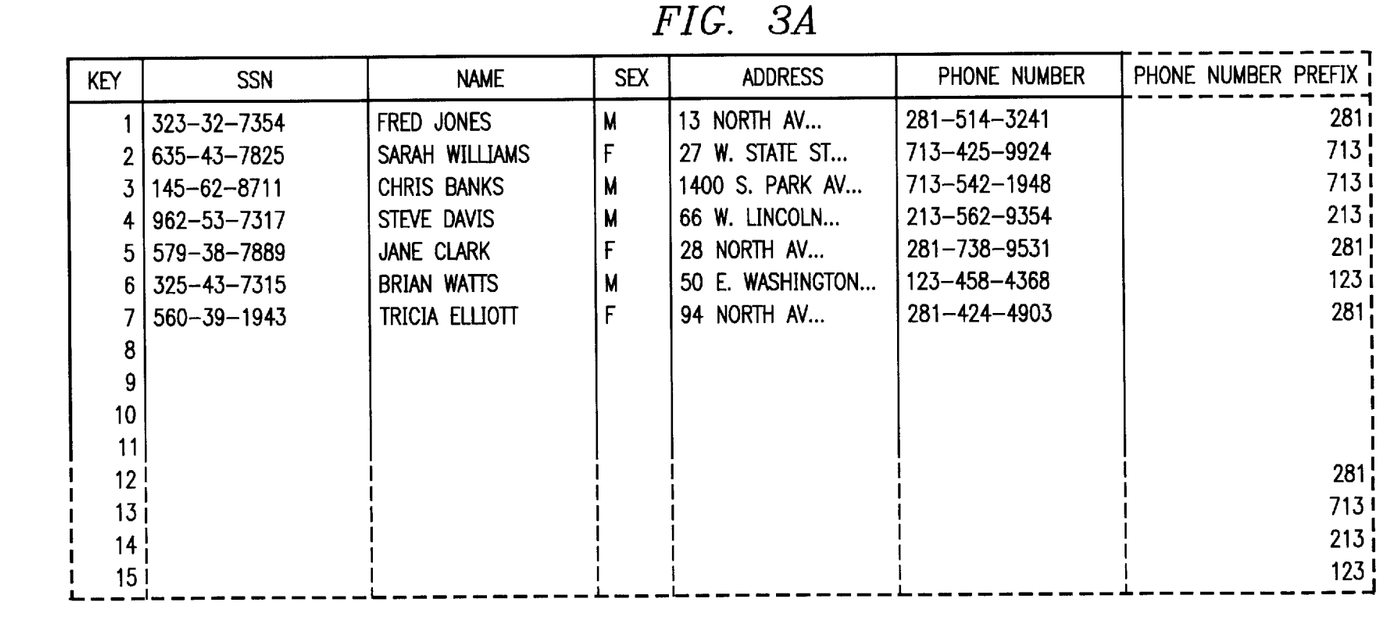
FIGS. 3A & 3B show a dimension table and a detail key to level member mapping table for a second example of a first embodiment of the invention.
Figure 3B:
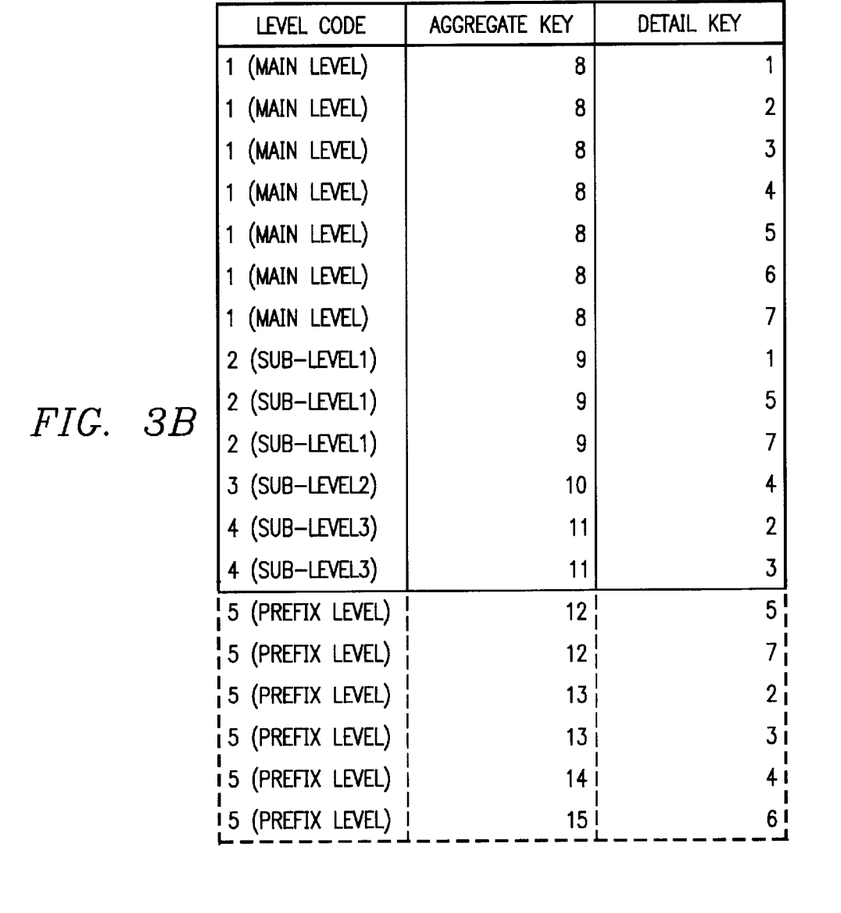

This example is represented in FIGS. 3A and 3B. An employee dimension is provided with the following attributes: SSN, name, sex, address, and phoneNumber.
Level Rule:
  Sublevel 1 Rule: substring (1, 3, phoneNumber)="281"
  Sublevel 2 Rule: substring (1, 3, phoneNumber)="213"
  Sublevel 3 Rule: substring (1, 3, phoneNumber)="713"

In this example, the level rule has no rule item which means all detail records from the dimension will be aggregated into one aggregate record (in this case aggregate record 8, as can be seen in FIG. 3B). Thus, only one aggregate record will be generated. This level rule contains three sublevel rules. Each sublevel rule compares the first three digits of the phone number (i.e., area code) to a particular value. Basically, the first sublevel rule creates an aggregate record (record 9) for all detail records with area code="281". Similarly, the second and the third sublevel rules create an aggregate record (records 10, 11) for all detail records with area code="213" and "713" respectively.

Again, these aggregates could not be achieved by just using the level rule. Using the sublevel rule condition in the level rule would mistakenly create an aggregate for each distinct phoneNumber with the specified area code.

Using the above sublevel rules, users could actually create one aggregate record for each area code provided that they could list all area codes, one in each sublevel rule. In the long run, users may still want to create a separate areaCode attribute in the dimension so that they could apply a level rule to the attribute. This would avoid the necessity of manually creating a sublevel rule for each new area code added. However, sublevels do solve the immediate problem of not having an extra attribute.

In an alternative embodiment, derived attributes could be defined during this process for aggregation purposes which are not stored with the actual dimension tables in the input fact data. Such a derived attribute is shown by a dotted line in FIGS. 3A and 3B. For example, an attribute could be defined by a function of the attribute columns in the data, and this derived attribute would act like an aggregate for aggregation purposes, and could be referenced in level and sublevel rules in the same way. For example, a derived attribute called phoneNumberPrefix could be defined with attribute definition function substring (1, 3, phoneNumber). Data could then be aggregated on the phone number prefix directly with a level rule (referred to in this example as the prefix level rule) including this attribute. In practice, using derived attributes is not convenient, as the attributes are generally stored in master files over time so that they are associated with particular synthetic keys that never change. Adding attributes accordingly requires reprocessing a lot of old data. While this feature is not provided by the presently preferred embodiment in order to simplify processing, such an embodiment is within the scope of the invention.

Sublevels also prove to be very useful in other similar scenarios. If a user wants to create one aggregate for the three biggest customers, the user could create an aggregate for all customers and have a sublevel rule listing the three biggest customers. This allows the user to see the aggregate of all three customers as one without creating a new attribute just for this purpose. It also allows the "top three" customers to be changed over time while still maintaining the same aggregate dimension record (this makes trends easier to analyze).

Once the level rules and sublevel rules have been specified for all dimensions, the aggregation levels are available for the cross-product of levels. The cross-product of levels allows a user to specify which aggregations across dimensions need to be added to the data warehouse.

A cross-product of levels is simply a list of entries, each of which has a level from each dimension. For the store, product, and period dimensions described earlier, a cross-product of levels might look like:
STORE×PRODUCT×DAY (detail or input data)
STORE×ALL_PRODUCTS×MONTH
ALL_STORES×PRODUCT×MONTH
ALL_STORES×ALL_PRODUCTS×MONTH
STORE×ALL_PRODUCTS×QUARTER
ALL_STORES×PRODUCT×QUARTER
ALL_STORES×ALL_PRODUCTS×QUARTER Although this list is short, in reality it can grow extremely long. If the user defined only ten levels per dimension for three dimensions, the list could be up to 1,000 entries long if all combinations were desired.

The invention further provides level groups to solve this problem. A level group is a list of levels from one dimension that can be entered as one entry in the cross-product of levels. The software automatically expands all the combinations represented by the level group. By defining a level group "PERIODS_GRP" that contained "MONTH" and "QUARTER", the above list could be shortened to:
STORE×PRODUCT×DAY (detail or input data)
STORE×ALL_PRODUCTS×PERIODS_GRP
ALL_STORES×PRODUCT×PERIODS_GRP
ALL_STORES×ALL_PRODUCTS×PERIODS GRP The meaning of this shortened list is identical to the prior list. This technique has the primary effect of making it much easier to maintain the cross-product because the user can group levels into single entities. In the example, the user always wants aggregates by month and quarter; using level groups (s)he only needs to add one entry to represent all desired period aggregates.

Level groups can contain aggregation levels, detail levels, and sublevels. Note that the above cross-product of levels can represent hundreds or even thousands of actual aggregate records, because each level has many aggregate records associated with it.

Level groups could also be defined to cover more than one dimension, and would expand into a cross product of the levels/sublevels included in each dimension. However, such a level group would only effectively be a short hand for writing out the level groups in each dimension involved, and would therefore not cut down on the number of cross product definitions involved in generating a cross product list. Providing such an option would make the interface more complicated (as each entry would then not correspond to a single dimension) and therefore its implementation is not considered advantageous.

There now follows a description of the system components that implement expression-based level identification, sublevels, and level groups. Level identification and sublevels are described in the context of a process known as dimension processing, during which input dimension records (representing transactions) are processed and the level rules are applied to each record. The result of the process is the derived list of dimension aggregate records, and the containment relationship between detail and aggregate records (i.e., which detail records must be combined to compute the aggregates represented by the aggregate record). This information is used during fact processing (at which time the fact records are read) to actually generate the aggregates based on the cross-product of levels specified by the user.

Level groups are described in terms of expanding the cross-product of levels to get the complete list of cross-products to compute.

Dimension processing must be performed for each dimension in the star schema and has the following input requirements:

1) List of Input Dimension Records
   There is one list of dimension records for each dimension. Each dimension record contains: a set of primary key(s) and a list of attributes. The following diagram shows the logical picture of a dimension record.

| Key₁ | ... | Keyₖ | Attributes₁ | ... | Attributes |
|------|-----|------|-------------|-----|------------|

The key fields contain the primary key of each dimension record. Some dimensions may have only one key field while others may need to combine multiple fields to uniquely identify a record.

Attribute, to Attribute represent the attribute values of a record. These attributes qualify the key value and describe the properties of each dimension record.

2) Dimension Record Definition

Associated with the list of input dimension records is a dimension record definition. It defines the position of each key and attribute fields. It also specifies the name and data type of each field. These are required for analyzing and parsing the level and sublevel rules. Field names are used in the rules to represent the corresponding field values. Data types are required to check if the specified operations on different fields are valid (e.g., arithmetic operations can not be performed on character data type fields.)

3) Level and Sublevel Rules

There is a set of level and sublevel rules associated with a dimension. These rules are specified according to the description in section 1.2. Users will have to investigate the set of aggregates to be generated, then specify the levels or sublevels required in each dimension in order to generate those aggregates.

4) Cross-Product of Levels

The user specifies a cross-product of levels that is used by the aggregate computation process (called fact processing) to determine which aggregates to build. This cross-product will include references to level groups that will need to be expanded prior to (or during) fact processing.

For the purposes of this document, the following simple objects are assumed to exist (or can easily be developed). It is assumed that the reader has sufficient C++ programming to be familiar with the implementation and purpose of these objects.

1) Standard Template Library

Many components in this embodiment utilize the Standard Template Library, now part of the C++ language standard, for container objects. The template vector class is used to implement simple arrays of objects.

2) String

A simple string class (with appropriate manipulation methods) is used to hold rule item expressions and other text.

3) Value

The Value object is an object that can contain values of various different data types. In database systems, values are typically strings, numbers, dates, or binary large objects (BLOBs). This simple class can hold all of the relevant types and "knows" the type of the value it currently is holding. This class simplifies development by allowing us to utilize a single object to represent the di verse data types present in database systems. Methods of a Value class include:

A) bool IsNull ( )—Indicates whether NULL value is set.
B) void SetNull ( )—Sets value to NULL.
C) DataType GetDataType ( )—Returns the data type of the current value.
D) void SetValue (data type v)—Sets the value. There is a SetValue method for each supported data type (datatype represents any supported data type).
E) void GetValue (datatype& v)—Returns the value. There is a GetValue method for each supported data type (datatype represents any supported data type). If the current value is of a different data type and cannot be converted to the requested type, an exception is thrown.

4) Record

A Record is simply a vector of Value objects. This class represents records read from the input dimension table. By using Value objects to represent a value from each corresponding column, it is unnecessary to consider the different data types. Methods of the Record class include:

int FieldCount ( )—Returns the number of fields (or columns) in the record.
void GetValue (int i, Value& v)—Returns the Value at the given index i.
void SetValue (int i, const Value& v)—Sets the Value at the given index i.
void Reset (int n)—Clears out the whole record and makes sure there is room for n fields.

5) ColumnDef

The ColumnDef is a column definition. The most important properties of a ColumnDef are the name of the column and its data type, but the ColumnDef also contains information about how to read the column from its table. That information is implementation-specific. Methods include:

DataType GetDataType ( )—Returns the data type of the column.
void GetName (String& name)—Gets the name of the column.

6) RecordDef

The RecordDef is the record definition. It is primarily a vector of ColumnDef objects, but also holds other implementation-specific methods about how to read the table. Methods include:

int ColumnCount ( )—Returns the number of columns.
void ResetColumns ( )—Clears all columns.
void RemoveColumn (int i)—Removes the column at index i.
void SwapColumns (int i, int j)—Swaps the columns at indices i and j.
ColumnDef* GetColumn (int i)—Get the column definition at index i.
void AddColumn (ColumnDef* pColDef)—Adds a column definition.

The object also has array indexing overloaded operators to make it easier to access fields.

7) RecordProvider

The RecordProvider is an abstract object that provides records to dimension processing. It could be an object that reads a flat file, a network socket, or the result of a SQL query. For our purposes herein the details of the RecordProvider are not important, but the following methods (or equivalents) should be available:

void Open (const RecordDef& recDef)—Opens the provider for the given record definition.
bool ReadRecord (Record& record)—Reads a record and returns TRUE when no more records are available.

bool IsAtEnd ( )—Returns true when no more records are available. void Close ( )—Closes the provider.

8) RecordCollector

The RecordCollector is an abstract object that knows what to do with the results of detail processing. The RecordCollector receives records representing aggregate dimension records and detail dimension records. In the presently preferred implementation, the system maintains the generated aggregate records and the original detail records in a large data file. The specific utilization of the records is implementation-specific; this document describes how the aggregate records are identified via the level rules. The RecordCollector has the following methods (or equivalents):

void WriteAggregate (const Record& detail, const Record& aggregate, const Level& aggrLevel)

This method receives an aggregate record that was generated for the given detail record. It may be called multiple times with the same detail or aggregate record. (Note: The Level type is defined later in this document—it is just an object for an aggregation level.)

The RecordCollector conceptually receives two things. First, it receives all of the aggregate records that have been produced for the dimension. Second, it receives the relationships between detail records and aggregate records. (By looking at the method parameters, one can see that the given detail is a part of the produced aggregate.) It is up to the RecordCollector to know what to do with this information. Those details are implementation-specific.

In the presently preferred software implementation, levels have integer codes assigned to them and all detail and aggregate dimension records are assigned a surrogate (or synthetic) integer key. The relationship between details and aggregates is written to a data file that contains records having the aggregation level code, detail synthetic key, and aggregate synthetic key. This data file is used during fact processing to determine into which aggregates the details must be combined. Additionally, all detail and aggregate dimension records are maintained in a data file. That is essentially how the particular RecordCollector of the present embodiment works, and it allows fact processing to be completed at a later time because all relevant data is saved after dimension processing completes.

The purpose of defining the Input Requirements and Assumed Objects is to describe the framework in which expression-based level identification, sublevels, and level groups operate. The overall framework described above is typical of systems performing aggregation; records are read from the RecordProvider, aggregate records are "discovered" based on the level rules and detail data, and the aggregate dimension records and their relationship to detail records is saved by the RecordCollector. After this process is performed for all dimensions, the level groups in the cross-product of levels are expanded in preparation for fact processing.

Objects that this specific embodiment of the invention utilizes are as follows:

1) Expression

The Expression object compiles and executes expressions. By passing a RecordDef when creating an expression, you can notify it of what columns should be available.

Expression (const RecordDef& recordDef)—Constructor to create an expression. The record definition is saved within the expression; those columns become available for expression text compiled with this object.

void Compile (const String& exprText)—Compiles the given text into an internal executable format.

bool IsColumnReferenced (int i)—Returns true if the column at index i in the record definition is referenced by the expression.

int GetFirstColumnRef ( )—Gets the index in the record definition of the first column referenced by this expression.

int GetColumnRefCount ( )—Gets the number of distinct columns referenced by this expression. (If the same column is referenced more than once it only counts once.)

void SetAggrEmptyValues (int index, bool yesNo)—As described earlier in the document, this controls for each column how the exists and not exists operators work. If yesNo is set to true for a column, then exists returns true for empty columns.

void Execute (Value& result, const Record* detailRecord, const Record* emptyRecord)—Executes the expression and places the result in result. detailRecord contains values of columns for the current detail record. emptyRecord contains the values that denote empty fields (like "N/A").

2) LevelRuleDef

The LevelRuleDef maintains a list of rule item expressions.

const BaseLevelDef* GetLevel ( )—Returns a pointer to the level that owns this level rule definition.

void Reset ( )—Resets all the rule items.

int GetNumRuleItem ( )—Returns the number of rule items.

const String& GetRuleItem (int i)—Returns the text of the rule item at index;

void InsertItem (const String& rule, int i=-1)—Inserts the given rule item at index i, or at the end if i is not specified.

void SetItem (const String& rule, int i =0)—Sets the text of the rule item at index i, which defaults to zero.

void DeleteItem (int i)—Deletes the rule item at index i.

3) BaseGroupLevelDef

The BaseGroupLevelDef is the base class of all level definitions, including groups. It contains methods for identifying the kind of level.

bool Is AggrLevel ( )—Returns true if the level definition is for an aggregation level.

bool IsSubLevel ( )—Returns true if the level definition is for a sublevel.

bool IsGroup ( )—Returns true if the level definition is for a level group.

4) BaseLevelDef: BaseGroupLevelDef

The BaseLevelDef is the base class of level definitions that have rule items, names, and codes.

const String& GetLevelName ( )—Returns the name of the level.

void SetLevelName (const String& name)—Sets the name of the level.

int GetLevelCode ( )—Returns the level code.

void SetLevelCode (int code)—Sets the level code.

const LevelRuleDef* GetLevelRule ( )—Returns a pointer to the level rule for this level definition. The return value is read-only.

LevelRuleDef* GetLeveiRule ( )—Returns a pointer to the level rule for this level definition. The returned object is used to to add level rule items to this level definition.

5) LevelDef: BaseLevelDef

The LevelDef is the base class of levels that have expressions to generate desciptions for the aggregate records. This is a feature specific to the present implementation.

const String& GetDescRule ( )—Returns the text of the description rule.

void SetDescRule (const String& descRule)—Sets the text of the description rule.

6) AggrLevelDef: LevelDef

The AggrLevelDef object represents the aggregation level definition and contains the text of the rule item expressions, the level name, and the level code (an integer identifier for the level). The object also maintains its list of sublevels.

SubLevelDef* CreateSubLevel (const String& name)—Creates a sublevel definition with the given name.

void DeleteSubLevel (SubLevelDef*& pLevel)—Removes the given sublevel from this aggregation level, and deletes it.

void DeleteSubLevel (const String& name)—Removes the sublevel with the given name from this aggregation level, and deletes it.

bool ContainSubLevel (const SubLevelDef& sublevel)—Returns true if this aggregation level contains the given sublevel.

void TransferSubLevel (SubLevelDef& sublevel, AggrLevelDef& newlevel)—Moves the sublevel from this aggregation level to newlevel.

void TransferSubLevel (const String& subname, AggrLevelDef& newlevel)—Moves the sublevel (identified by its name) from this aggregation level to newlevel.

int GetNumSubLevels ( )—Returns the number of sublevels.

void GetSubLevels (vector<SubLevelDef*>& vSubLevels)—Gets all of the sublevels into a vector. The sublevels can be modified.

void GetSubLevels (vector<const SubLevelDef*>& vSubLevels)—Gets all of the sublevels into a vector. The sublevels are read-only.

7) SubLevelDef: BaseLevelDef

The SubLevelDef is the definition of a sublevel. In addition to the features of an aggregation level, it knows what level contains it.

const LevelDef* GetRefLevel ( )—Returns the level definition of the containing level.

8) GroupDef: BaseGroupLevelDef

The GroupDef object maintains the list of levels and sublevels in the group.

void AddLevel (const BaseLevelDef& level)—Add a level to the group. The level argument may be an aggregation level or a sublevel.

void AddLevels (const vector<const LevelDef*>& plevels)—Add a list of levels to the group.

void AddLevels (const vector<const SubLevelDef*>& plevels)—Add a list of sublevels to the group.

void RemoveLevel (const BaseLevelDef& rlevel)—Removes the given level from the group.

void Reset ( )—Removes all levels and sublevels from the group.

bool ContainLevel (const BaseLevelDef& rlevel)—Returns true if the group contains the given level.

vector<const LevelDef*>GetLevels ( )—Returns a vector containing the aggregation levels of this group.

vector<const SubLevelDef*>GetSubLevels ( )—Returns a vector containing the sublevels of this group.

vector<const BaseLevelDef*>GetAillLevels ( )—Returns a vector containing the levels and sublevels of this group.

vector<const LevelDef*>GetLevelsByCode ( )—Returns a vector containing the levels and sublevels of this group, sorted by level code.

bool IsEmpty ( )—Returns true if the group does not contain any levels or sublevels.

9) CrossProduct

The CrossProduct object maintains the list of level definitions, one from each dimension, for a single entry in the cross-product list.

void SetGroup (const GroupDef& rGrp)—Sets a level group in the cross product. Deletes any prior group for that dimension.

void SetLevel (const BaseLevelDef& rLevel)—Sets a level or sublevel definition in the cross product. Deletes any prior definition for that dimension.

void SetGroupAndLevels (const vector<const BaseGroupLevelDef*>& vObjs)—Sets the list of level, sublevel, or group definition to the cross product. The list should contain one definition from each dimension. It replaces any existing definitions.

vector<const BaseGroupLevelDef*>GetGroupAndLevelsBy DimName ( )—Gets the list of level, sublevel, or group definitions ordered by dimension name.

vector<const BaseGroupLevelDef*>GetGroupAndLevelsBy Name ( )—Gets the list of level, sublevel, or group definitions ordered by level name.

void RemoveGroup (const GroupDef& rGrp)—Remove a level group definition.

void RemoveLevel (const BaseLevelDef& rLevel)—Remove a level or sublevel definition.

bool ContainGroup (const GroupDef& rGrp)—Returns true if the cross product contains the given group.

bool ContainLevel (const BaseLevelDef& rLvl)—Returns true if the cross product contains the given level or sublevel.

bool operator==(const CrossProduct& inProd)—Comparison operator that returns true if this cross product is identical to the given cross product. int GetSize ( )—Returns the number of entries in the cross product, which should be the same as the number of dimensions.

void Reset ( )—Removes all level definitions from the cross product.

10) Level

The Level object contains information needed to identify and process aggregation levels and sublevels. It is created given either an aggregation level definition or a sublevel definition. For aggregation levels, the mpSublevelRule data member is NULL. For sublevels, expressions in mvLevelRule and mpSublevelRule are all evaluated.

Level (Dimension& dimension, const AggrLevelDef* pLevel)—Constructor that builds the level object given the dimension and an aggregation level definition Level (Dimension& dimension, const SubLevelDef* pLevel)—Constructor that builds the level object given the dimension and a sublevel definition.

Dimension& GetDimension ( )—Returns the dimension of this level.

const Dimension& GetDimension ( )—Returns the dimension of this level, but read-only.

const String& GetName ( )—Gets the name of this level.

bool IsSubLevel ( )—Returns true if the level was created from a sublevel definition.

bool IsAggrLevel ( )—Returns true if the level was created from an aggregation level definition.

int GetLevelCode ( )—Returns the integer level code for this level.

void MakeDescription (const Record& rec, String& desc)—Creates the description for the given record using the description rule and places the description text into desc. This feature is specific to the present implementation.

bool MatchRecord (const Record& rec)—Returns true if the given input detail record participates in this level. Within this method the level rule is evaluated by executing the rule item expressions. For sublevels, both the parent level's rule and the sublevel rule must be evaluated.

void PopulateRecord (const Record& inputRec, Record& popRec)—Given the input detail record inputRec, this method creates the record that contains the attributes of the aggregate dimension record. Columns are populated with NULLs unless a column is referenced by the level rule, in which case the column is copied from inputRec.

bool DescRuleUsesColumn (int index)—Returns true if the description rule references the column at index index.

bool LevelRuleUsesColumn (int index)—Returns true if the level rule references the column at index index.

Data members of the Level object include:

Dimension& mDimension—A reference to the dimension object that holds this level.

const BaseLevelDef* mpLevel—A pointer to the level definition for this level, which may be an AggrLevelDef or a SubLevelDef.

Expression* mpDescRule—A pointer to the expression object that evaluates the description.

vector<Expression*>mvLevelRule—A vector of pointers to the rule item expressions for this level. For aggregation levels, there are zero or more rule item expressions, each of which reference one and only one distinct column. For sublevels, this data member is populated with the rule item expressions from the parent aggregation level.

Expression* mpSublevelRule—A pointer to the expression that evaluates the sublevel rule. This expression references one or more columns. This is NULL unless the Level object is a sublevel.

11) Dimension

The Dimension object is a holder of the information that is interesting to dimension processing. This information includes the Level objects for this dimension as well as the record definition for the dimension table.

const RecordDef GetSourceTable ( )—Gets the record definition of the source dimension table.

int GetNumSourceColumns ( )—Gets the number of source columns.

const ColumnDef* GetSourceColumn (int i)—Gets the source column definition at the given index i.

int GetNumAggrLevels ( )—Gets the number of aggregation levels and sublevels.

Level& GetAggrLevel (int i)—Gets the Level object at the given index i.

const Record& GetEmptyValueRecord ( )—Gets the record containing the values that are considered to be empty (like "N/A").

The data members of a Dimension object include:

RecordDef mSourceTableDef—The record definition for the dimension.

vector<Level*>mvAggrLevels—A vector containing the aggregation levels and sublevels.

Record mEmptyRecord—A record containing the values that are to be considered empty (like "N/A").

There is a class hierarchy of objects dedicated to maintaining the definition of levels. These are used by the system to build the actual level objects that are used to test which aggregates detail records are members of.

The heart of expression-based level identification and sublevels is how input detail records are matched against levels. This occurs during dimension processing. Level groups are handled after dimension processing by expanding the cross-product of levels. This section describes how the objects previously described are used and some details about how they work.

Dimension processing is a loop that reads all input detail records, matches them against levels, and sends the corresponding aggregate records to the record collector. This process is depicted in the following C++ style pseudo-code:

```
// Create and populate Dimension
Dimension dim;
// (population not shown)
// Create reader
RecordProvider reader;
// Open reader
reader.Open (dim.GetSourceTable ( ));
// Create record collector
RecordCollector collector;
// Loop through all records
Record sourceRec;
int n = dim.GetNumAggrLevels ( );
while (reader.ReadRecord (sourceRec) != true) {
    // Loop through each level
    for (int j = 0; j < n; j++) {
        // Get the next level
        Level& level = dim.GetAggrLevel (j);
        // Match the record against the level
        if (level.MatchRecord (sourceRec) == true) {
            // Populate an aggregate record
            Record aggrRec;
            level.PopulateRecord (sourceRec, aggrRec);
            // Pass the data to the record collector
            collector.WriteAggregate (sourceRec,
                        aggrRec,
                        level);
        }
    }
}
```

```
// Close reader
reader.Close ( );
```

The work of expression-based level identification and sublevels takes place in the MatchRecord method. Note that the record collector must only keep unique aggregate records in its list, because WriteAggregate can be called many times with the same aggregate.

Matching a record involves executing the rule item expressions, as is depicted in the following C++ style pseudo-code:

```
bool Level::MatchRecord (const Record& rec)
{
    Value val;
    bool b;
    // Test level rule expressions
    vector<Expression*>::iterator iter = mvLevelRule.begin ( );
    while (iter != mvLevelRule.end ()) L
        (*iter)->Execute (val, &rec,
                          &(mDimension.GetEmptyValueRecord ( )));
        val.GetValue (b);
        if (b != true)
            return false;
        iter++;
    }
    // Test sublevel rule
    if (IsSubLevel ( )) {
        mpSublevelRule->Execute (val, &rec,
                          &(mDimension.GetEmptyValueRecord ( )));
        val.Getvalue (b);
        if (b != true)
            return false;
    }
    return true;
}
```

Populating a record involves copying from the source record the columns utilized by the level rule items, as is depicted in the following C++ style pseudo-code:

```
void Level::PopulateRecord (const Record& inputRec,
                            Record& popRec)
{
    // Loop through the fields
    int SZ = inputRec.FieldCount ( );
    popRec.Reset (sz);
    for (int i = 0; i < sz; i++) {
        if (isColumnReferenced (i))
            popRec[i] = inputRec[i];
        else
            popRec[i].SetNull ( );
    }
}
The isColumnReferenced method referred to therein is implemented
as follows:
bool Level::isColumnReferenced (int index)
{
    vector<Expression*>::const_iterator iter =
                          mvLevelRule.begin ( );
    while (iter != mvLevelRule.end ( )) {
        if ((*iter)->IscolumnReferenced (index))
            return true;
        iter++;
    }
    return false;
}
```

It utilizes the Expression's ability to detect whether a column is referenced.

Detail and aggregate dimension records are collected by the RecordCollector. As already mentioned, the record collector is responsible for "knowing" what to do with the information obtained from dimension processing. The record collector receives information about which aggregate records exist for the given detail records, based on the levels defined. Additionally, the collector receives information about what detail records "go with" which aggregate records. All of this information is used during the later step of fact processing, when the aggregates are actually generated.

The process of expanding the cross-product of levels is quite simple. Whenever a level group is encountered, all combinations are produced within a big loop. The pseudo-code for the overall process is as follows:

For each entry in the cross-product of levels {
    Expand the entry into a list of entries with no groups;
    For each entry in the expanded list{
        If the entry is unique
            Add the entry to the target cross-product;
    }
}

The pseudo-code to expand the level groups in a single cross-product entry is as follows:

```
// SourceEntry is the source cross-product entry, a vector of
//     pointers to levels.
// TargetList is the target cross-product list, a vector of
//     (vectors of pointers to levels).
Clear out TargetList;
Add one biank entry to TargetList;
For each dimension D {
    Get the index I of the level for dimension D;
    If the level SourceEntry [I] is a group {
        Get the size S of TargetList;
        Get the number of levels N in group SourceEntry[I];
        If N is Zero {
            Remove all entries from TargetList;
            Return;
        }
        Make TargetList larger by N times;
        For values J from 0 to N - 1 {
            Get Jth level L from group SourceEntry[I];
            For vaiues K from 0 to S - 1 {
                TargetList[J*S+K] = TargetList[K];
                TargetList[J*S+K] [I] = L;
            }
        }
    }
    Else {
        Get the size S of TargetList;
        For values K from 0 to S - 1 {
            TargetList[K] [I] = SourceEntry[I];
        }
    }
}
```

The above process can be illuminated with a simple example. Suppose we have three dimensions and a cross product entry like { $L_1$, $G_1$, $G_2$ } where $L_1$ is a level, $G_1$ is a group containing levels $L_2$ and $L_3$, and $G_2$ is a group containing levels $L_4$ and $L_5$. (Note: heavy areas represent the added entries; bold text represents added levels.)

After looping for the first dimension, the target list contains:

| $L_1$ | blank | blank |
| --- | --- | --- |

After the second dimension, the target list contains:

| | | |
|---|---|---|
| $L_1$ | $L_2$ | blank |
| $L_1$ | $L_3$ | blank |

And, after the third dimension, the target list contains the final fully-expanded cross-product list:

| | | |
|---|---|---|
| $L_1$ | $L_2$ | $L_4$ |
| $L_1$ | $L_3$ | $L_4$ |
| $L_1$ | $L_2$ | $L_5$ |
| $L_1$ | $L_3$ | $L_5$ |

After all entries in the original cross-product list are expanded, they are merged into the final target list (but only unique entries are retained).

This technology described herein has the advantage of providing an extremely flexible and powerful way to select aggregated data for a data warehouse, and is also straightforward to implement.

Expression-based level identification solves the problems associated with large data warehouses by allowing users to easily and flexibly select the data they really need to aggregate.

Sublevels allow users to select levels for which attributes must be derived; this is helpful when aggregates are not in the source data or when complex or changing aggregation criteria is desirable.

Level groups make selection of the cross-product of levels much simpler by allowing the user to group related levels and deal with a substantially shorter cross-product list.

There follow details some of the features of the presently preferred expression language and some implementation notes. This section lists all the operations that are allowed in the presently preferred expressions. Additional operations could be supported to extend the capability of the level or sublevel rules.

Comparison Operations

These operations take two operands. They compare the two operands, evaluate if the condition is true or false, and return the resulting boolean value. The two operands for comparison must be of compatible data types.

| Operators | Descriptions |
|---|---|
| =, eq | equal |
| <>, ne | not equal |
| >, gt | greater than |
| >=, ge | greater than or equal to |
| <, lt | less than |
| <=, le | less than or equal to |

Arithmetic Operations:

These operations take one or two operands depending on the operators. They perform the calculation and return the resulting numeric value.

| Operators | Descriptions |
|---|---|
| add | add the numeric values of the two operands. |
| Sub | subtract the right hand (or second) operand from the left hand (or first) operand. |
| Mult | multiply the numeric values of the two operands. |
| Div | divide the left hand (or first) operand by the right hand (or second) operand. |
| Idiv | integer divide the left hand (or first) operand by the right hand (or second) operand. |
| Imod | integer divide the left hand (or first) operand by the right hand (or second) operand and return the remainder of the division. |
| Abs | return the absolute value of the numeric operand. |
| Neg | negate the value of the numeric operand. |
| Trunc | truncate the value of the numeric operand. |

String Manipulation Operations:

These operations perform different kinds of string manipulations on a string operand. They also take other operands to perform the tasks. The following is a list of the operations.

| Operators | Operands | Descriptions |
|---|---|---|
| substr | index, count, string | return the substring of string starting at index for count characters. |
| Concat | string1, string2 | concatenate the strings string1 and string2 and return the resulting value. |
| Toupper, tolower | string | convert the string to all upper or lower case correspondingly |
| parsenumber | string, formatString | parse the string using the format specified in formatString and return the resulting numeric value. |
| Parsedate | string, formatString | parse the string using the format specified in formatString and return the resulting date value. |
| Leftpad, rightpad | string, padchar, count | repetitively pad the left or the right side of the string using the padchar character for count times. |
| Trimleft, trimright, trimboth | string | remove leading, trailing, or both leading and trailing space characters from the string respectively. |
| Insert | string, insertString, index | insert the insertString into string at index position. |
| Delete | string, index, count | delete count no. of characters starting at index position from string. |
| Replace | string, searchString, replaceString, count | search in string for the searchString pattern and replace it with the replaceString for count occurrences; If count = −1, that means for all occurrences of replaceString. |
| Length | string | return the length of the string. |
| Char | charCode | convert the numeric charCode unicode code to a string containing only the unicode character. |

Date Operations:

These operations perform different kinds of date arithmetic and date conversions.

| Operators | Operands | Descriptions |
|---|---|---|
| now | N/A | return a datetime value containing the current date and time. |
| Date | year, month, day, | construct and return a datetime value which contains the specified year, month, and day. Its time is set to all zeros. |
| Datetime | year, month, day, hour, minute, second | construct and return a datetime value which contains the specified year, month, and day, hour, minute, and second. |

-continued

| Operators | Operands | Descriptions |
| --- | --- | --- |
| Year, month, day, hour, minute, second | dateTime | extract and return the year, month, day, hour, minute, or second component respectively from the dateTime value. |
| Diffyears, diffmonths, diffdays, diffhours, diffminutes, diffseconds | dateTime1, dateTime2 | calculate and return the difference in years, months, days, hours, minutes, or seconds respectively between the dateTime1 and dateTime2 values. |
| Dayofweek | dateTime | calculate and return the day of week for the dateTime value. |
| Dayofyear | dateTime | calculate and return the day of year for the dateTime value. |
| Daysleftinyear | dateTime | calculate and return the days left in the year specified in dateTime. |

Formatting Operations:

These operations format string, datetime, and numeric values into character strings. They format the values based on a format string. The expression system will have to understand the syntax of the format string in order to format the values accordingly.

| Operators | Operands | Descriptions |
| --- | --- | --- |
| formatchar | string, formatString | format the string using the format specified in formatString. |
| Formatdate | dateTime, formatString | convert and format the dateTime value to a string using the format specified in formatString. |
| Formatnumber | number, formatString | convert and format the number value to a string using the format specified in formatString |

Logical Operations:

Three commonly used logical operators are supported: and, or, not. They all take boolean operand(s) and return a boolean value as result.

Constant Values:

Three special constant values are supported: true, false, and NULL. The true or false constant values are used by boolean expressions. The NULL value is for indicating null column (or field) value.

Registers:

Allow the use of registers or variables. Each register is associated with a name. Only the assign operator is allowed to modify the value inside a register. Registers can be used to hold any type of temporary values and can be used in any appropriate operations.

Since the operations performed on each dimension are independent, multiple instances of dimension processing can be executed in parallel (one for each dimension) to process multiple or all dimensions at one time.

In the presently preferred implementation, RPN expressions are used to represent the level and sublevel rules. Other expression languages could easily be substituted.

While the preferred embodiment of the invention has been shown and described, it will be apparent to those skilled in the art that changes and modifications may be made therein without departing from the spirit of the invention, the scope of which is defined by the appended claims.

What is claimed is:

1. A method of defining an aggregate level in at least one dimension corresponding to groupings of detail data entries in a database, said dimension detail entries representing a set of entities in said dimension, wherein each dimension detail entry comprises at least one attribute field, wherein values stored in said attribute fields are values of an attribute, said attribute being common to each of said entities, said method of defining an aggregate level comprising the steps of:

specifying as a level rule at least one attribute in said dimension to be associated with said level, such that said level has at least one member, each member corresponding to an attribute value of each of said at least one attributes, and each member being associated with at least one detail entry in said dimension with the same attribute values as the level member; wherein at least one of said rules comprises a logical expression dependent on the attribute values of an attribute incorporated in said level definition and determines whether level members representing attribute values satisfying said logical expression are present in the level;

whereby data in said database being aggregated can be grouped based on the values of attributes incorporated in said level rule, and a determination can be made as to whether a specific data entry should contribute to a corresponding group based on whether it satisfies the logical expression associated with said level rule.

2. A method of defining an aggregate sublevel in at least one dimension corresponding to groupings of detail data entries in a database, said dimension detail entries representing a set of entities in said dimension, wherein each dimension detail entry comprises at least one attribute field, wherein values stored in said attribute fields are values of an attribute common to each of said entities, and wherein said database includes fact data entries each associated with a detail entry in said dimension, said method of defining aggregate sublevels for a dimension comprising the steps of:

defining a level by specifying at least one attribute in said dimension to be associated with said level, such that said level has at least one member, each member corresponding to an attribute value of each of said at least one attributes, and each member being associated with at least one detail entry in said dimension with the same attribute values as the level member; wherein specifying a logical expression which each detail entry in said dimension may or may not satisfy to define a subset of the detail entries contributing to said level thereby to form said sublevel, such that level members in the sublevel are a subset of the level members in the level, and such that each member in said sublevel is associated with a subset of the detail entries of the corresponding level member in said level;

whereby said sublevel acts as a level but furthermore provides control over which fact data entries in said database contribute to the members of the sublevel during aggregation.

3. A method in accordance with claim 2 wherein each of said levels in a dimension is defined by a set of rules, each rule specifying an attribute of said dimension on which said level is to be grouped.

4. A method in accordance with claim 2 wherein each of said sub-levels in a dimension is defined by at least one rule specifying conditions defining which detail entries in that dimension are to be associated with level members in the sub-level.

5. A method in accordance with claim 4 wherein said rule specifies conditions dependent on field values of said detail entries.

6. A method of defining a plurality of cross products of levels for use in aggregating input fact data comprising fact data entries in a database, wherein said database comprises a plurality of dimensions each representing a set of entities and containing dimension detail entries, each representing one of said entities; wherein each dimension detail entry comprises at least one attribute field, and wherein values stored in said attribute fields are values of an attribute, said attribute being common to each of said entities; and wherein said levels are defined in each of said dimensions by specifying at least one attribute in said dimension to be associated with said level, such that said level has at least one member, each member corresponding to an attribute value of each of said at least one attributes, and each member being associated with at least one detail entry in said dimension with the same attribute values defining the level member; said method comprising the steps of:

representing at least two of said levels in one of said dimensions as a level group;

selecting at most one level or level group from each of said dimensions, at least one of which is a level group to define a level group cross-product;

converting said level group cross product into said plurality of level cross products by generating a level cross product for every combination of levels in the level groups of the cross product, each level cross product generated incorporating a level from each level group in said level group cross product and also incorporating any levels in said level cross product which do not comprise a level group;

whereby a user of said database can generate a first set of level cross-products involving a first level in a dimension and a second set of level cross products identical except for the replacement of said first level with a second level in said dimension, without explicitly defining both said first and second sets.

* * * * *